Feb. 2, 1937. T. R. KENNEDY 2,069,495
HYDROGEN REGULATOR FOR CONVERTER SPARK GAPS
Filed Jan. 2, 1936

WITNESS
James R. Coley

INVENTOR.
Theodore R. Kennedy
BY
Frank T. Chesnut
ATTORNEY

Patented Feb. 2, 1937

2,069,495

UNITED STATES PATENT OFFICE 2,069,495

HYDROGEN REGULATOR FOR CONVERTER SPARK GAPS

Theodore R. Kennedy, Morrisville, Pa., assignor to Electrothermic Corporation, Ajax Park, Ewing Township, N. J., a corporation of New Jersey Application January 2, 1936, Serial No. 57,189

8 Claims. (Cl. 250—38)

My invention deals with the maintenance and regulation of an atmosphere of hydrogen in a spark gap of the type commonly used with a converter equipment for supplying high frequency current to an induction furnace.

A purpose of my invention is to maintain an atmosphere of hydrogen in a gap having constantly varying pressure fluctuations with the least expenditure of hydrogen.

A further purpose is to eliminate the variations in power in a converter system due to cumulative pressure or vacuum in the spark gap of such system.

A further purpose is to maintain a positive gas pressure on a spark gap over long intervals to obviate the necessity of flushing the gap before each operation or series of operations.

A further purpose is to improve and insure the uniform operation of a mercury bubbler by passing the gas through an amalgamated copper tube below the surface of the mercury.

A further purpose is to provide a positive and easy method of determining when leaks occur in a gas filled spark gap system.

Further purposes will appear in the specification.

Five figures have been used by way of illustration of my invention.

In the figures like numerals and letters designate like parts.

Figure 1:
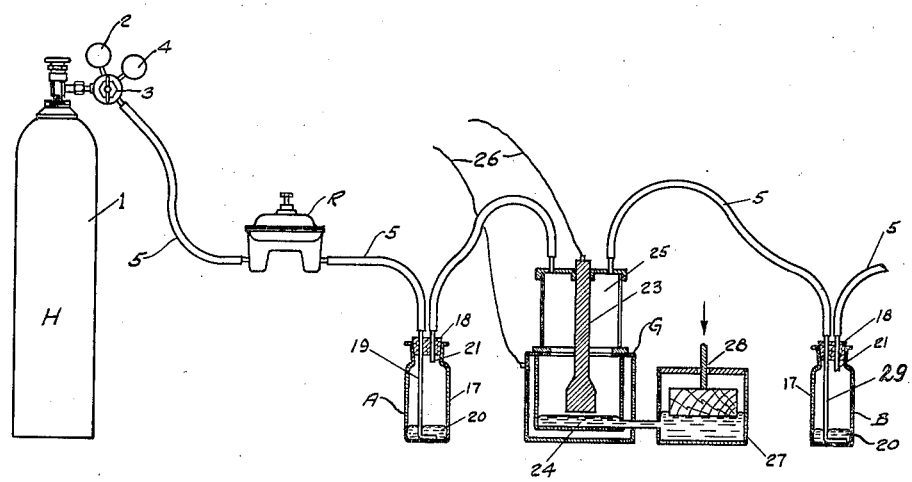
Figure 1 is a diagrammatic line drawing, partly in section, showing a spark gap and hydrogen regulator assembly according to my invention.

One type of spark gap for which the present invention is adapted is described in U. S. Patents 1,587,932 to Bagley and 1,594,846 to Northrup.

An equipment for which the spark gap is commonly used is described in U. S. Patent 1,286,394 to Northrup and in later patents. The evolution of the hydrogen-mercury gap may be traced from gaps using an alcohol vapor system, to the hydrogen gas type and finally to the hydrogen atmosphere type described in U. S. Patent 2,006,731 to Chestnut. It can be seen from the history of the gap that no substantial power was achieved in the converter type furnace until the mercury-hydrogen combination was discovered. A gap operating without a hydrogen atmosphere and between mercury and a solid electrode or solid electrodes gives approximately one-fifth the power obtainable if the area around the gap is flooded with hydrogen. In actual test, with a 35 kv-a converter and a given load, the power obtainable was increased from 6 to 35 kw. by flooding the gap chamber with hydrogen, and with no other change.

It has been shown in the above referred to patents that no other gas yet tried has the same excellent characteristic as hydrogen. It appears to be an indispensable medium for this type of apparatus, but its use provides a certain degree of cost, danger and inconvenience.

In all of the earlier equipments, and in a majority of the equipments sold today, hydrogen is made to flow through the gap. Before starting, the gap chamber must be flushed out thoroughly to prevent a hydrogen-air explosion. Even with the greatest care these explosions sometimes occur, causing the parts of the gap to break open. When breaks do occur the equipment must be shut down until repairs can be made. It was some five or ten years after the hydrogen gap was first used that the danger from explosion was somewhat elleviated by the inclusion in the gap wall of a safety window which would blow out instead of a part of the wall proper. These windows are made of mica and are easily replaceable. The flushing out process however, has not been elminated and most of the hydrogen used in the operation of the equipment is lost during these frequent flushing out periods.

In addition to explosions caused by insufficient flushing of the gap are those due to "suck backs." The arc in the type of gap described is very fluctuating, and hot. The gap length commonly varies from zero to one and one-half inches and the current from zero to 300 amperes. The heat from the arc causes the gas in the gap chamber to expand, and when the arc fluctuates as it normally does, or when the loading or power is varied, or when the arc fails or goes out at high loads, the pressure varies radically, sucking air or the sealing medium into the gap chamber. Even with the best seals provided to date on both the inlet and outlet sides of the gap chamber, air inevitably is drawn back into the gap to burn or explode, with the hydrogen, depending upon the mixture present. If the seals hold, the air tends to leak into the gap through ill fitting or worn gaskets. Air thus sucked into the gap, in addition to causing annoying explosions also causes the mercury to become sludgy and interferes with the otherwise good operation of the gap. Still again the suctions and pressures created in a gap chamber push out or draw in the mercury from the adjoining well, changing the effective gap length and hence the power delivered by the equipment. This at times is a cumulative effect and causes "hunting" of the power, from zero to full load, or fractions thereof, and vice versa. The only cure for this pressure variation characteristic is to make sufficient hydrogen flow through the gap at all times to prevent a vacuum condition from arising.

From about 1917 until the present time these spark gaps, and especially in the larger sizes, have been open to the afore-described faults.

About 1929 it was discovered that a hydrogen flow in these gaps was not essential to good operation; a hydrogen atmosphere being equally effective. It was found that the hydrogen was not used up except for a very small percentage on first operation. Some experimental gaps were made for the smaller type converters with a given amount of hydrogen hermetically sealed within them. Some of these have been used on equipments continuously since that date and are still in good operating condition. Recently tests have been made to seal gaps for the larger converters. The net result of these tests shows that since hydrogen is not expended in normal operation of the gaps, the amount required should be sufficient only to overcome that lost by leakage. The following system, the subject of the present invention, was the result.

Figure 2:
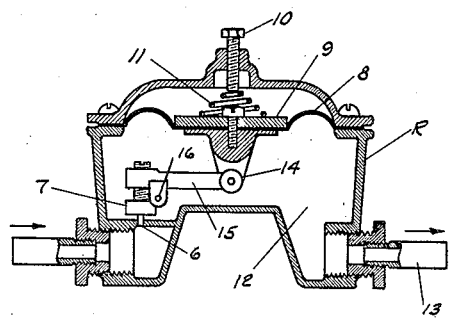
Figure 2 is a detailed section drawing of a Reynold's gas pressure regulator.

Referring to the figures, I propose to supply hydrogen for operation of the gap from the customary tank 1. A high pressure gauge 2 is used to indicate the pressure of the gas in the tank. A pressure reducing valve 3 is used to admit gas at a lower pressure, indicated by gauge 4, to the rest of the apparatus. The gas is led through a tube 5 into a regulator R. The pressure found convenient for the inlet to the regulator is about 5 pounds. The regulator R, Figure 2 is adapted with a valve 6, a valve closure 7, a flexible diaphragm 8, a regulating weight 9, a regulating screw 10 operating on the weight 9 through a regulating spring 11, a gas chamber 12 and an outlet tube 13. It is the standard Reynold's or gas regulator used on domestic gas services for regulating the pressure at the utility outlets. By means of adjustment screw 10 and the weight 9 the pressure of the gas in the chamber 12 and in the equipment attached to the outlet tube may be maintained at a relatively constant and low pressure. The gas in the chamber 12 acts over the large area of the diaphragm and weight with equal pressure, and just balances it at the desired pressure. When the gas pressure drops the weight falls, opening the valve 6 by raising the closure 7, through arms 14 and 15, operating around the pivot 16. When pressure has returned to normal the weight is moved upward and the afore-mentioned levers close the valve 6. The regulator is quick acting, accurate and fool proof. I have found that a pressure equivalent to the weight of a column of mercury one-eighth to one-quarter of an inch high is a satisfactory pressure for operation with the equipment described.

Figure 3:
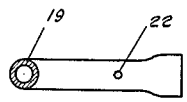
Figure 3 is a fragmentary elevation view of the hydrogen inlet tube in the bubbler on the inlet side of the spark gap of Figure 1.

From the regulator R I lead the gas through a tube 5 into a mercury bubbler A. This bubbler comprises a bottle 17 with a close fitting stopper 18, an inlet tube 19, a pool of mercury, or other liquid 20, and an outlet tube 21. The inlet tube is preferably a copper tube bent to an L-shape, sealed at the lower end and drilled with a small opening as shown in Figure 3 at 22. The tube is preferably amalgamated, if adapted to operate under mercury, and the outlet 22 is adapted to clear the main stem of the tube 19 so that hydrogen will bubble freely through the orifice and up through the one-eighth inch of mercury provided over it. If the orifice 22 were made near to the main stem 19, and especially if the tube were not amalgamated, the hydrogen would flow up along the sides of the tube without definitely showing its flow.

From the bubbler A the gas is again led through a tube 5 into the spark gap chamber. The spark gap G, comprises an electrode or electrodes, 23, a pool of mercury 24, a closed arcing chamber 25, electrical contacts 26, and generally a plunger pot 27 connected to the gap pot for raising and lowering the level of the mercury in the gap chamber 25. The plunger pot 27 is open to the atmosphere where its operating stem protrudes at 28.

Figure 4:
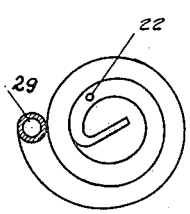
Figure 4 is a fragmentary elevation view of the hydrogen inlet tube in the bubbler on the outlet side of the spark gap of Figure 1.
Figure 5:
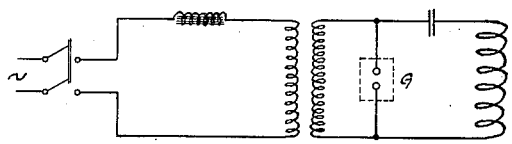
Figure 5 is a circuit diagram of a converter and furnace equipment showing where a gap such as is described in the specification is customarily used.

The hydrogen from the gap G is led from the chamber 25, through another tube 5 into a second bubbler B, and thence out to the air. The bubbler B is generally similar to A except that the inlet tube 29 is spiraled at its lower end as in Figure 4, and the height of mercury over its opening is approximately one-quarter of an inch. The tubes are amalgamated similarly. By having the portion of the tube under the mercury in bubbler B of greater length than that in A it offers a greater resistance to the flow of hydrogen and acts as a damper to very sharp fluctuations in the gas pressure. In this way the sudden rush of gas which usually follows an arc fluctuation is trapped in the line and is returned to the gap when the pressure subsides. No gas is lost from the system by sudden pressure changes. If the pressure continues, the gas escapes and more is drawn from the tank to replace it.

By having the head of mercury in the second bubbler higher than in the first, I provide working limits for the assembly. If the average pressure in the regulator chamber is equivalent to three-sixteenths of an inch of mercury it will always be sufficient to overcome the one-eighth inch head in the first bubbler but not the one-quarter inch head in the second bubbler. So long as the pressures remain constant therefore no hydrogen is lost. When the pressure in the gas increases slightly due to heat from the arc the head in bubbler B is overcome and gas escapes to the air. When the pressure subsides the head in bubbler A is overcome and more gas is admitted by the regulator R. If at any time a leak occurs in the gap, as by faulty seals, the pressure tends to drop from slightly above atmospheric to atmospheric and gas is continuously admitted by the regulator through the first bubbler. When this occurs the bubbles appearing in the first bubbler are a warning that a leak exists and the gap can be re-sealed.

When first operating a gap having a system such as described the regulator control screw 10 is depressed opening the valve 6 wider than normal and permitting gas to flow freely through the whole system. This thoroughly flushes all air from the system, and the screw may be returned to its operating position. Once such a flushing out has been effected, no further flushing is necessary until the gap loses its positive hydrogen pressure. This usually happens only when parts of the assembly require replacement.

The life of a 200 cubic foot tank of hydrogen operating on a 35 kv-a. converter system has been here-to-fore from one week to one month of commercial operation, depending largely upon the skill of the operator. With the present assembly a similar amount of hydrogen should last relatively many times longer. It is estimated that on a carefully watched system such an amount will last several years.

Where in my disclosure I have referred to certain pressures these references have been by way of explanation. I do not wish to limit myself to any particular dimensions or materials, but claim as my invention all such as fall reasonably within the scope and intention of my disclosure.

What I claim as new and patentable and desire to protect by United States Letters Patent is described in what is claimed.

1. In a converter spark gap system a gap chamber having inlet and outlet vents, a mercury bubbler connected to the inlet side of the gap chamber adapted to receive hydrogen from a supply tank and to pass same through a head of mercury into the gap chamber, a mercury bubbler connected to the outlet side of the gap chamber adapted to receive hydrogen from the gap chamber and to pass it through a head of mercury greater than on the inlet bubbler, a pressure regulator between the hydrogen supply line and the inlet bubbler adjusted to pass automatically substantially large quantities of hydrogen at pressures greater than the head of mercury in said inlet bubbler and less than the head of mercury in said outlet bubbler to maintain automatically a substantially constant pressure in said gap chamber during use.

2. In a converter spark gap system a gap chamber adapted to hold a gas at a given pressure, means to vent said gas automatically at pressures a little above this figure and a pressure regulator for admitting gas automatically and rapidly to said chamber when the pressure falls a little below this figure.

3. In a converter spark gap system a gap chamber adapted to hold a gas at a given pressure, means to vent said gas automatically at pressures a little above this figure and a pressure regulator for admitting gas automatically and rapidly to said chamber only when the pressure falls a little below this figure and damping means in said venting outlet to prevent gas from escaping during momentary periods of higher pressure.

4. In a converter spark gap system, a gap chamber adapted to hold a gas at slightly above atmospheric pressure, inlet and outlet lines for flowing a gas through said gap chamber, sealing means on said inlet and outlet lines and a gas pressure control regulator adjusted to pass a gas from a reservoir into said gap chamber, automatically, whenever the pressure in said gap chamber tends to drop to atmospheric pressure.

5. In a converter spark gap system, a gap chamber adapted to hold a gas at slightly above atmospheric pressure, inlet and outlet lines for flowing a gas through said chamber, means for restricting the flow of gas through said outlet tube and a pressure regulator for automatically increasing the inlet flow of gas when the pressure in the gap chamber tends to drop to atmospheric pressure.

6. In a converter spark gap system, a gap chamber, sealed, except for inlet and outlet hydrogen lines and a by-pass line leading to a mercury reservoir and nominally filled with mercury, to hold a gas at a pressure slightly above atmospheric pressure, means for automatically venting said gas only when the pressure more than slightly exceeds said pressure for an appreciable period, additional means in said venting line for preventing the escape of gas during periods of momentary higher pressures, pressure regulator means to insure a sufficient flow of gas into the gap chamber to maintain a substantially constant pressure therein during operation and means for visually showing when a leak occurs in said chamber.

7. In a mercury bubbler system, the combination of a mercury amalgamated copper tube, a pool of mercury surrounding a portion of said tube and a vent in said portion of said tube.

8. In a mercury bubbler system, the combination of a mercury amalgamated copper tube having vertical and horizontal portions, a pool of mercury surrounding the horizontal portion of said tube and a vent in the horizontal portion away from the vertical portion of said tube.

THEODORE R. KENNEDY.